United States Patent [19]

Rostin et al.

[11] Patent Number: 4,715,485
[45] Date of Patent: Dec. 29, 1987

[54] CLUTCH DISC FOR A MOTOR VEHICLE FRICTION CLUTCH

[75] Inventors: Günther Rostin, Schweinfurt; Dagwin Tomm, Kaiserslautern; Franz Hartig, Dittelbrunn, all of Fed. Rep. of Germany

[73] Assignee: Fichtel & Sachs AG, Schweinfurt, Fed. Rep. of Germany

[21] Appl. No.: 712,354

[22] Filed: Mar. 15, 1985

[30] Foreign Application Priority Data

Mar. 17, 1984 [DE] Fed. Rep. of Germany ....... 3409829

[51] Int. Cl.$^4$ .......................... F16D 3/14; F16D 3/66; F16D 13/75
[52] U.S. Cl. .............................. 192/106.2; 192/106.1; 192/110 R; 464/68
[58] Field of Search ............. 192/106.2, 106.1, 110 R, 192/70.17, 70.25; 464/66, 68

[56] References Cited

U.S. PATENT DOCUMENTS

| | | | |
|---|---|---|---|
| 1,896,914 | 2/1933 | Paton | 192/106.2 |
| 2,183,130 | 12/1939 | Binder | 192/106.2 |
| 2,276,416 | 3/1942 | Nutt | 192/106.2 |
| 4,152,906 | 5/1979 | Brown | 192/106.2 X |
| 4,274,525 | 6/1981 | Raab et al. | 192/106.2 |
| 4,474,276 | 10/1984 | Loizeau | 192/106.1 |
| 4,501,570 | 2/1985 | Konrad | 192/110 R X |
| 4,537,295 | 8/1985 | Fädler | 192/106.2 |
| 4,548,309 | 10/1985 | Braun | 192/106.2 |

FOREIGN PATENT DOCUMENTS

688630 2/1940 Fed. Rep. of Germany .
1094762 12/1967 United Kingdom ............. 192/106.2

*Primary Examiner*—Rodney H. Bonck
*Assistant Examiner*—Richard M. Lorence
*Attorney, Agent, or Firm*—Toren, McGeady & Associates

[57] ABSTRACT

The clutch disc for a motor vehicle friction clutch comprises a friction lining carrier mounted rotatably on a hub, a torsional vibration spring means and a torsional vibration friction damper. The friction damper is arranged between side discs of the friction lining carrier and includes a spring of annular disc form and at least one friction ring seated in the support path. The installation height of the axially acting spring is variable after the assembly of the clutch disc, by an adjusting device. The adjusting device can be two adjusting elements rotatable in relation to one another, which vary the installation height of the spring by steps or steplessly. The adjusting device can also comprise permanently deformable adjusting elements or adjusting elements seated with press fit on the hub.

4 Claims, 25 Drawing Figures

CLUTCH DISC FOR A MOTOR VEHICLE FRICTION CLUTCH

BACKGROUND OF THE INVENTION

The invention relates to a clutch disc for a motor vehicle friction clutch which comprises a torsional vibration spring means and a torsional vibration friction damper.

STATEMENT OF PRIOR ART

Conventional clutch discs, such as are known for example from U.S. Pat. No. 4,274,525, comprise a hub for coupling with the gear input shaft and a friction lining carrier mounted rotatably through a limited angle of rotation on the hub. In the torque transmission path between hub and friction lining carrier there is arranged a torsional vibration spring means. The spring means comprises two guide parts held on the hub rotatably in relation to one another about the axis of rotation of the clutch disc. One of the guide parts is connected non-rotatably with the friction lining carrier and the other is connected non-rotatably with the hub. One of the guide parts consists of two substantially radially extending disc parts firmly connected with one another at an axial distance from one another, while the other of the two guide parts comprises a substantially radially extending third disc part arranged axially between the first and second disc parts. The springs of said spring means are seated in windows of the three disc parts and are subjected to compression stress in the relative rotation of the disc parts. The known clutch disc further comprises an axially acting stressing spring substantially of annular disc form arranged axially between two of the disc parts, particularly a dished spring. In the supporting force path of the stressing spring, a friction ring is seated between two friction faces connected non-rotatably each with one of the guide parts.

The friction torque of the friction damper is greatly dependent upon the manufacturing tolerances of the individual components and the spring force tolerances of the stressing spring and can vary greatly. On the other hand the friction torque must be kept within narrow tolerance limits if torsional vibrations are to be optimally damped. Clutch discs of the type as explained above with a friction damper arranged in protected manner between the axially lateral disc parts would have to be dismantled, if the friction torque did not lie within the required tolerance limits after assembly is completed, and re-fitted after adjusting work. Subsequent adjustment of this clutch disc type was not possible hitherto.

From German Patent No. 688,630 a clutch disc with a torsional vibration spring means and a torsional vibration friction damper is known in which the friction damper comprises several mutually independently adjustable friction devices. Each of the friction devices comprises externally arranged and thus unprotected friction discs which, stressed towards one another by a likewise externally arranged helical compression spring, enclose one of the disc parts frictionally between them. The initial stress force of each spring is adjustable by means of a clamp bolt axially penetrating the clutch disc and a nut.

OBJECT OF THE INVENTION

It is an object of the invention to provide a clutch disc for a motor vehicle friction clutch in which the torsional vibration friction damper, arranged in protected manner between two disc parts, can be adjusted to predetermined friction torque values even after assembly of the clutch disc.

SUMMARY OF THE INVENTION

This problem is solved in accordance with the invention in that in the support force path of a friction damper stressing spring having annular disc form, an adjusting device is arranged by means of which the axial distance between the radially outer marginal region and the radially inner marginal region of the stressing spring is variable.

By means of such an adjusting device it is possible to adjust the installation height of the stressing spring after the assembly of the clutch disc.

The construction of the adjusting device should be as simple as possible in order to keep production expense low. At the same time the adjusting device should be easily adjustable. In a preferred embodiment the adjusting device comprises two adjusting elements rotatable in relation to one another about the rotation axis for the adjustment of the axial marginal distance of the stressing spring. Each of said elements comprises a plurality of support faces offset in relation to one another in the circumferential direction, by means of which the adjusting elements are axially supportable on one another. The support faces of at least one of the two adjusting elements each comprise, for supporting the other adjusting element in each case, a plurality of surface regions offset in relation to one another transversely of the circumferential direction and lying side by side in the circumferential direction. Such supporting faces can be formed even on cheaply producible parts, for example sheet-metal shaped pieces. The surface regions of the support faces of said one adjusting element are distributed in the circumferential direction so that the stressing spring is supported in uniformly distributed manner in each adjusting position along its circumference.

The support faces of at least one of the two adjusting elements can be groups of axial support steps axially offset in relation to one another and arranged substantially on one common diameter. The support faces of the other adjusting element are in this case provided on protuberances arranged with spacing from one another in the circumferential direction. The protuberances engage axially in the support steps. Such support faces can be impressed without problem into sheet-metal pieces of disc form or formed particularly on circumferential marginal portions of disc parts in the form of tongues or the like. In place of an axial stepping of the support faces, these can also be radially stepped if the protuberances of the other adjusting element extend obliquely towards the axis of rotation, that is to say can be offset more or less far axially in relation to the support steps in dependence upon the radial depth of the radial support steps.

A third variant is achieved if the support faces of at least one of the two adjusting elements are formed as axially rising oblique faces, seen in the circumferential direction, upon which there abut support faces, provided on protuberances, of the other adjusting element. Adjusting elements of this kind permit a continuous variation of the installation height of the stressing spring and thus of its initial stress force.

In a preferred embodiment, the support faces of one of the two adjusting elements are arranged on one of the disc parts. The support faces of the other adjusting element are provided on a ring part of substantially annular disc form arranged axially between this disc part and the disc part axially adjacent thereto. In this embodiment, particularly if the ring part is the stressing spring of annular disc form or a thrust ring of substantially disc form abutting on the friction ring, no additional components are necessary. The support faces of the adjusting elements can be formed on already present components of the clutch disc, for example in the form of support tongues and/or support steps.

Detent shoulders facing in the circumferential direction, which detain the ring part through the support tongues under the action of the initial stressing spring non-rotatably on the disc part, are expediently allocated at least to the support steps of one of the groups of support steps. In adjustment the detaining engagement can be released against the spring force of the stressing spring, so that the ring part can be rotated in relation to the disc part. Detent fastenings of the above kind can be used not only with adjusting devices adjustable in adjustment steps but also with adjusting elements which permit a stepless variation of the installation height of the stressing spring. In order however that the stepless variability of such adjusting devices may be exploited, other fixing measures are preferred in the case of adjusting devices of this kind. More particularly, it can be provided that the two adjusting elements are stuck, swaged or welded with one another after adjustment has taken place.

The clutch disc is of such conformation that the two adjusting elements rotatably in relation to one another are accessible even when the clutch disc is in the assembled condition. For this purpose passage openings for tools can be provided in the lateral disc parts, or an annular gap can be provided between the lateral disc part and the hub, through which the adjusting element arranged axially between the disc parts protrudes out or at least is accessible for adjusting tools.

A further way with relatively low constructional expense for producing an adjusting device adjustable in a simple manner for a torsional vibration friction damper of the clutch disc of a motor vehicle friction clutch consists in arranging in the support force path of the stressing spring at least one deformation member which is permanently axially deformable against the force of the stressing spring. The deformation member is deformed after the fitting of the clutch disc, utilizing the spring travel, to such extent that the desired stress force of the stressing spring and thus the desired friction torque result.

The deformation member supports the stressing spring preferably uniformly at a plurality of points distributed in the circumferential direction. Several bending tabs offset in relation to one another in the circumferential direction can be provided on an additional ring part, but preferably on one of the disc parts of the clutch disc. Axially flattenable corrugated rings or axially deformable connecting members between the two outer disc parts of the clutch disc are also suitable. By axial compression of such connecting members the two disc parts can be brought closer to one another, whereby the installation height of the stressing spring is reduced.

A further embodiment in which the installation height of the stressing spring can be subsequently adjusted even when the clutch disc is assembled, with comparatively low construction expense, coxprises a ring seated with press fit axially displaceably on the hub. The stressing spring is supported directly or indirectly on the ring. The press fit holds the ring non-shiftably on the hub against the force of the stressing spring, but it can be displaced by suitable tools acting axially upon the ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED-EMBODIMENTS

Figure 1:
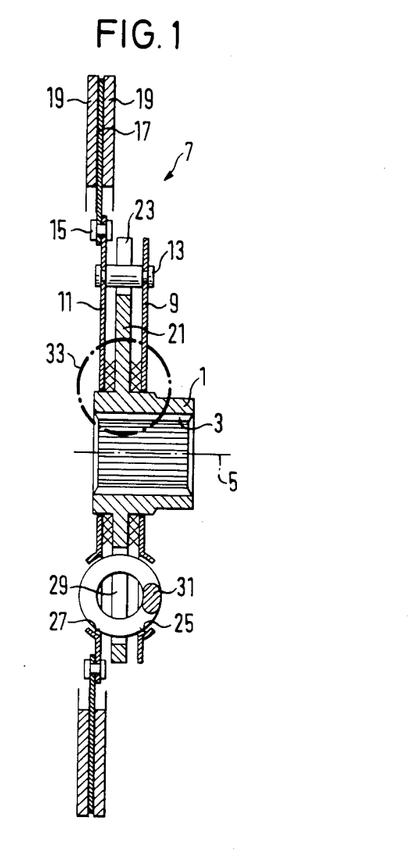
FIG. 1 shows an axial longitudinal section through a clutch disc with a torsional vibration spring means and an adjustable torsional vibration friction damper for a motor vehicle friction clutch.

FIG. 1 shows the fundamental assembly of a clutch disc for a motor vehicle friction clutch. The clutch disc comprises a hub 1 of substantially sleeve form which is couplable by means of its internal toothing 3 non-rotatably but axially displaceably with an input shaft (not shown further) rotatable about a rotation axis 5, of a motor vehicle gear. A friction lining carrier 7 is mounted rotatably through a limited angle of rotation about the rotation axis 5 on the hub 1. The friction lining carrier 7 comprises two side discs 9, 11 formed as sheet-metal-shaped parts of substantially annular disc form, which are firmly connected with one another at an axial distance from one another by means of distance rivets 13. On the external circumference of the side disc 11 a driver disc 17 likewise of annular disc form is secured with rivets 15 and in turn carries clutch friction linings 19 on both axial sides. A hub flange 21 of disc form protruding substantially radially from the hub 1 extends axially between the side discs 9, 11. The distance rivets 13 pass through apertures 23 on the circumference of the hub flange 21 and limit the angle of rotation of the friction lining carrier 7 in relation to the hub 1.

In the side discs 9, 11 and the hub flange 21 there are provided windows 25, 27 and 29 respectively which are substantially aligned axially with one another when the clutch disc is in the rest position and in which helical compression springs 31 are seated. The helical compression springs 31 are subjected to compression stress in the relative rotation of the friction lining carrier 7 and the hub 1, and form a torsional vibration spring means. FIG. 1 shows only one of several helical compression springs arranged in distribution in the circumferential direction.

An adjustable torsional vibration friction damper, explained in greater detail hereinafter in various embodiments, is indicated at 33 in FIG. 1. The friction damper 33 is adjustable, with the clutch disc assembled, as regards the stress force of its stressing spring and thus as regards its friction torque, in order that component tolerances may be compensated.

In the following explanation of different embodiments of friction dampers, components which have been explained by reference to the clutch disc according to FIG. 1 are designated by the same reference numerals and additionally by a letter. For the more detailed explanation of the components designated by the same reference numerals, reference is made to the description of FIG. 1.

Figure 2:
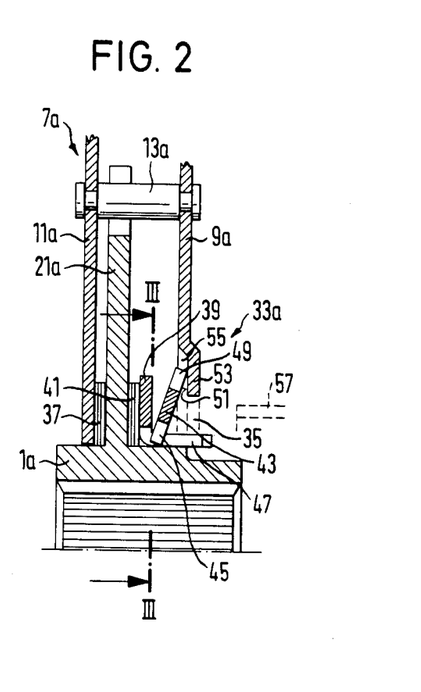
FIG. 2 shows an axial longitudinal section through a first embodiment of a friction damper adjustable by steps, usable in the clutch disc according to FIG. 1.
Figure 3:
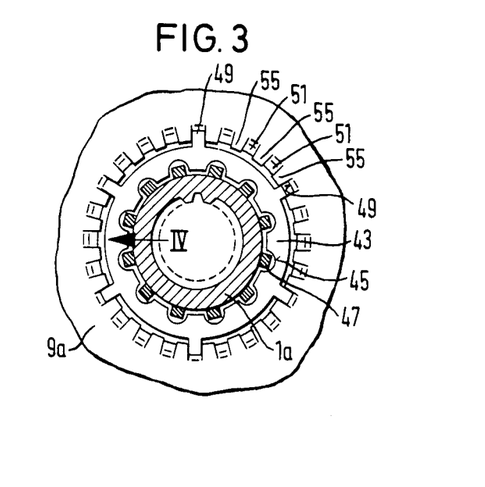
FIG. 3 shows an axial cross-section through the friction damper seen along a line III—III in FIG. 2.
Figure 4:
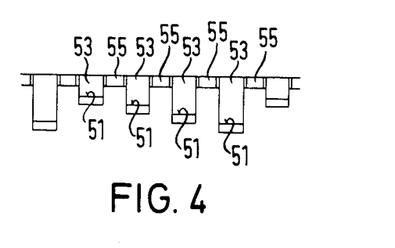
FIG. 4 shows a detail view of the friction damper seen in the direction of an arrow IV in FIG. 3.

FIGS. 2 to 4 show a friction damper 33a the friction torque of which is adjustable, with the clutch disc assembled. The friction lining carrier 7a is guided rotatably but axially movably on the hub 1a by means of its side disc 11a. The side disc 9a, connected by distance rivets 13a with the side disc 11a to form one unit, forms an annular gap 35 between its internal circumference and the hub 1a.

Axially between the side disc 11a and the hub flange 21a held on the hub 1a a friction ring 37 enclosing the hub 1a is seated in frictional contact with these parts. A thrust ring 39 of substantially disc form is arranged axially between the hub flange 21a and the other side disc 9a. A further friction ring 41 is seated axially between the thrust ring 39 and the hub flange 21a, in frictional contact with these parts. On the side axially remote from the friction ring 41 a dished spring 43 enclosing the hub 1a is braced in between the thrust ring 39 and the side disc 9a. The dished spring 43 is provided on its internal circumference with cutaway portions 45 in which there engage tongues 47 protruding axially to the side disc 9a from the internal circumference of the thrust ring 39. The tongues 47 couple the thrust ring 39 non-rotatably but axially movably with the dished spring 43.

A plurality of support tongues 49 arranged with spacing from one another in the circumferential direction protrudes substantially radially from the external circumference of the dished spring 43. For each of these support tongues 49 a group of support steps 51 of different depths in the axial direction, four support steps 51 in the embodiment as illustrated, is formed in the side disc 9a. The support steps 51 are formed by tongues or axial abutment steps 53 angled into approximately Z-shape, which protrude substantially radially inwards from the internal circumference of the side disc 9a. Further, likewise radially inwardly protruding tongues or snap-in shoulders 55 are left with axial spacing on the side of the dished spring 43 in the circumferential direction between the tongues 53. The support tongues 49 engage between the tongues 55 and lie on the axial side face of the tongues 53. The tongues 55 detain the dished spring 43 and thus the thrust ring 39 non-rotatably on the side disc 9a of the friction lining carrier 7a.

The dished spring 43 is supported with its internal circumference through the thrust ring 39 and the friction ring 41 on the hub flange 21a. The external circumference of the dished spring 43 is supported through the side disc 9a, the distance rivets 13a, the side disc 11a and the friction ring 37 on the axially opposite side of the hub flange 21. The dished spring 43 installed in the clutch disc can be compressed by means of a tool 57 introducible through the annular gap 35 to such extent that the support tongues 49 can be adjusted over the tongues 55 on to other support steps of the associated group. By rotation of the dished spring 43 it is possible to adjust the distance between its internal circumference and its external circumference and to vary the friction torque of the friction damper 33a. The friction damper 33a requires no additional components, compared with conventional friction dampers; its adjusting elements can be formed additionally on already existing components.

Figure 5:
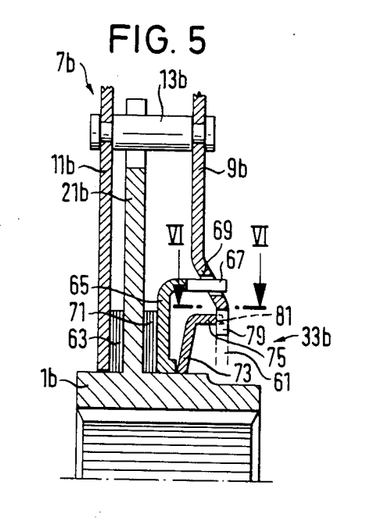
FIG. 5 shows an axial longitudinal section through a second embodiment of a friction damper adjustable by steps and usable in the clutch disc according to FIG. 1.
Figure 6:
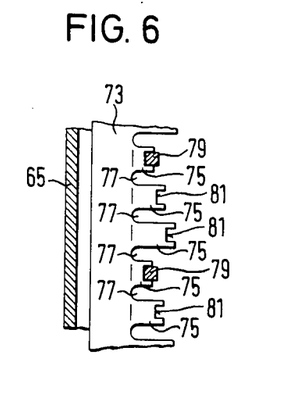
FIG. 6 shows a detail view of the friction damper seen along a line VI—VI in FIG. 5.

FIGS. 5 and 6 show a friction damper 33b adjustable in steps, which similarly to the friction damper 33a likewise does without additional components. The side discs 9b and 11b of the friction lining carrier 7b, firmly connected with one another through distance rivets 13b, are again guided non-rotatably but axially displaceably on the hub 1b by means of the side disc 11b. An axial gap 61 is left between the internal circumference of the side disc 9b and the hub 1b for the adjustment of the friction damper 33b. A friction ring 63 is seated axially between the side disc 11b and the hub flange 21b. A thrust ring 65, from the external circumference of which tabs 67 protrude axially, is arranged axially between the side disc 9b and the hub flange 21b. The tabs 67 engage in openings 69 of the side disc 9b and guide the thrust ring 65 non-rotatably but axially displaceably on the side disc 9b. A further friction ring 71 is arranged axially between the thrust ring 65 and the hub flange 21b. A dished spring 73 is braced in axially between the thrust ring 65 and the side disc 9b. The dished spring 73 is supported with its internal circumference on the thrust ring 65. Support tongues 75 arranged with spacing from one another in the circumferential direction are formed integrally on the external circumference of the dished spring 73. The support tongues 75 protrude substantially axially from the dished spring 73 and are separated from one another by slots 77. In order not to impair the spring properties of the dished spring 73, the slots 77 reach to its external margin. The support tongues 75 have different axial lengths by groups. The friction damper 33b as illustrated has for example three support tongues 75 of different lengths. To each group of support tongues there is allocated a support tongue 79 protruding substantially radially inwards from the internal circumference of the side disc 9b. The support tongues 79, in conformity with the groups of support tongues 75, are arranged with spacing from one another in the circumferential direction and engage in apertures 81 on the free axial ends of the support tongues 75. The apertures 81 in combination with the support tongues 79 form detent elements which engage the dished spring 73 non-rotatably on the side disc 9b. The dished spring 73 can be disengaged from the detent engagement and rotated in relation to the side disc 9b by means of a tool which can be introduced through the annular gap 61.

Figure 7:
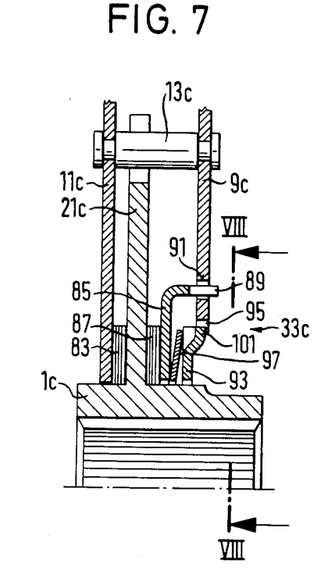
FIG. 7 shows an axial longitudinal section through a third embodiment of a friction damper adjustable by steps and usable in the clutch disc according to FIG. 1.
Figure 8:
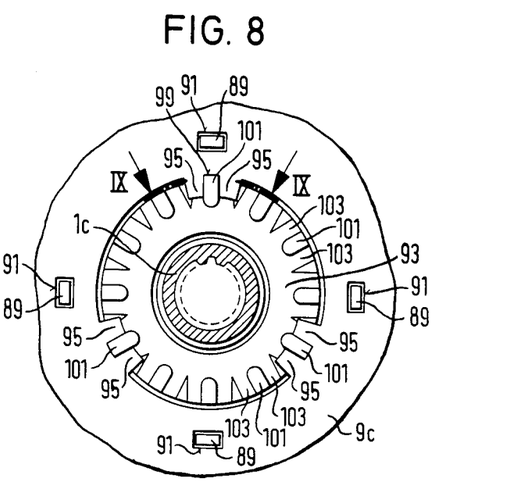
FIG. 8 shows an axial cross-section through the friction damper seen along a line VIII—VIII in FIG. 7.
Figure 9:
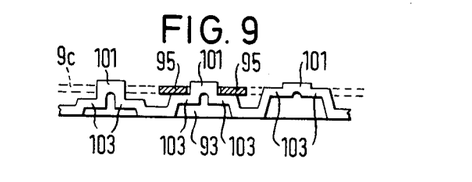
FIG. 9 shows a detail view of the friction damper seen along a line IX—IX in FIG. 8.

FIGS. 7 to 9 show a friction damper 33c adjustable in steps, which is assembled using conventional dished springs. The side discs 9c and 11c, which are firmly connected with one another through distance rivets 13c, are guided by means of the side disc 11c non-rotatably but axially displaceably on the hub 1c. A friction ring 83 is seated axially between the hub flange 21c and the side disc 11c, in conformity with the friction dampers as explained above. A thrust ring 85 is arranged axially between the hub flange 21c and the side disc 9c and a further friction ring 87 is seated between the thrust ring 85 and the hub flange 21c. On the external circumference of the thrust ring 85 there are formed tabs 89 which engage in openings 91 of the side disc 9c and guide the thrust ring 85 non-rotatably but axially displaceably on the side disc 9c. In an annular gap formed by the internal circumference of the side disc 9c and the hub 1c there is seated an annular support disc 93 formed as sheet-metal-shaped part, which abuts on its side axially remote from the hub flange 21c in the region of its external circumference on a plurality of support tongues 95 of the side disc 9c arranged with spacing from one another in the circumferential direction. A conventional dished spring 97 is braced in axially between the support disc 93 and the thrust ring 85.

The support tongues 95 protrude radially inwards in pairs from the internal circumference of the side disc 9c and form detent slots 99 between them in which detent noses 101 formed on the support disc 93 can engage. For each pair of support tongues 95 a group of support steps 103 arranged by pairs on both sides of the detent noses 101 in the circumferential direction is formed on the support disc 93. The support step pairs 103 of each group are offset in relation to one another in the axial direction so that the axial distance between the support disc 93 and the side disc 9c is adjustable by rotation of the support disc 93 in relation to the side disc 9c. Correspondingly, the stress force of the dished spring 93 is adjustable from the exterior, with the clutch disc assembled.

Figure 10:
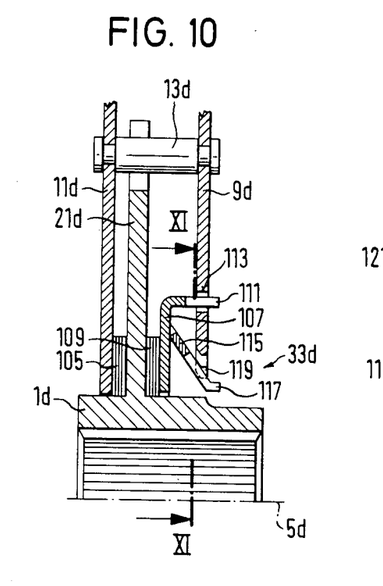
FIG. 10 shows an axial longitudinal section through a fourth embodiment of a friction damper adjustable by steps and usable in the clutch disc according to FIG. 1.
Figure 11:
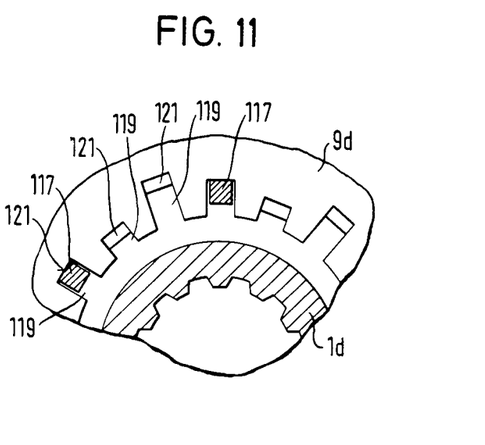
FIG. 11 shows an axial cross-section through the friction damper seen along a line XI—XI in FIG. 10.

FIGS. 10 and 11 show a further friction damper 33d, which is adjustable by steps from the exterior after assembly of the clutch disc has taken place, the side discs 9d and 11d of which damper are connected into one unit by distance rivets 13d and guided rotatably but axially displaceably on the hub 1d as a unit by means of the side disc 11d. A friction ring 105 is seated axially between the side disc 11d and the hub flange 21d. A thrust ring 107 is arranged axially between the hub flange 21d and the side disc 9d and a further friction ring 109 is arranged axially between the thrust ring 107 and the hub flange 21d. The thrust ring 107 carries tabs 111 on its external circumference which engage in openings 113 of the side disc 9d and guide the thrust ring 107 non-rotatably but axially displaceably on the side disc 9d. A dished spring 115 is braced in axially between the thrust ring 107 and the side disc 9d. To this extent the assembly of the friction damper 33d corresponds to the friction dampers as explained above.

Several support tongues 117 arranged with spacing from one another in the circumferential direction protrude obliquely of the rotation axis 5d of the clutch disc from the internal circumference of the dished spring 115. A group of radial slots 119, here three slots 119 per group, is formed in the internal circumference of the side disc 9d for each of the support tongues 117. The slots 119 extend substantially in the same plane normal to the axis and have different radial lengths within the group. The bottoms of the slots 119 of each group form support steps 121 arranged on different diameters and extending approximately parallel to the support tongues, on which steps the support tongues 117 rest. The axial distance of the dished spring 115 from the side disc 9d is determined by the depth of the slots 119 in which the support tongues 117 engage. The edges of the slots 119, facing in the circumferential direction, engage the dished spring 115 non-rotatably on the side disc 9d. The free ends of the support tongues 117 extend through beneath the internal circumference of the side disc 9d and form actuating elements by means of which the detent engagement can be released and the dished spring 115 can be rotated in relation to the side disc 9d.

Figure 12:
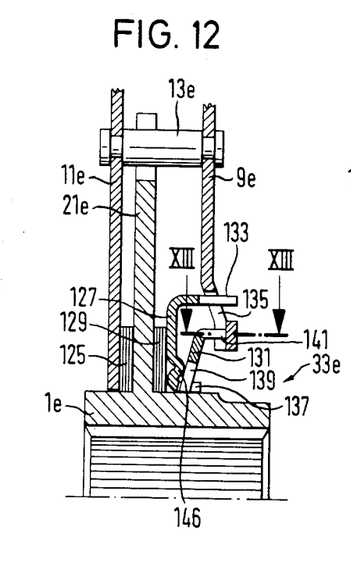
FIG. 12 shows an axial longitudinal section through a fifth embodiment of a friction damper adjustable by steps and usable in the clutch disc according to FIG. 1.
Figure 13:
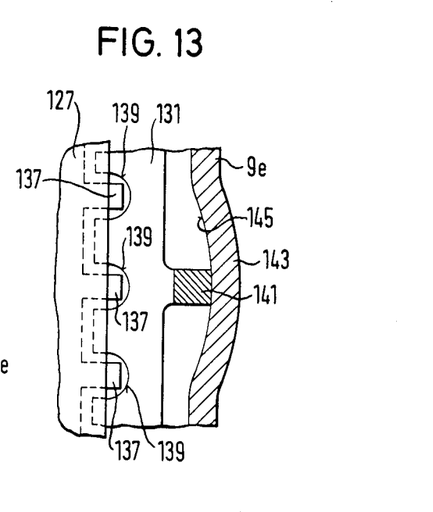
FIG. 13 shows a detail view of the friction damper seen along a line XIII—XIII in FIG. 12.

FIGS. 12, 13 show a friction damper 33e which is adjustable by steps. The side discs 9e and 11e connected with one another through distance rivets 13e to form one unit, are guided rotatably but axially displaceably on the hub 1e by means of the side disc 11e. A friction ring 125 is seated axially between the side disc 11e and the hub flange 21e. A thrust ring 127 is arranged axially between the side disc 9e and the hub flange 21e and a further friction ring 129 is arranged axially between the thrust ring 127 and the hub flange 21e. A dished spring 131 is braced in axially between the thrust ring 127 and the side disc 9e. To this extent the friction damper 33e is in correspondence with the friction dampers as explained above.

The thrust ring 127 carries axially protruding tabs 133 on its external circumference which engage in apertures 135 of the side disc 9e and guide the thrust ring 127 non-rotatably but axially displaceably on the side disc 9e. The thrust ring 127 carries on its internal circumference tabs 137 protruding axially to the dished spring 131 which engage in apertures 139 on the internal circumference of the dished spring 131 and couple the dished spring non-rotatably but axially movably with the thrust ring 127 and thus non-rotatably with the side disc 9e. The dished spring 131 carries a plurality of such apertures 139 so that it is engageable with the side disc 9e in a plurality of positions in relation thereto which are offset in angle in relation to one another.

The thrust ring 127 carries on its side axially facing the dished spring 131, radially between the internal circumference and the external circumference of the dished spring 131, an annular rib 146 or several protuberances distributed in the circumferential direction, about which the dished spring 131 can be tilted by means of an adjusting tool introduced between the hub 1e and the internal circumference of the side disc 9e. The tabs 137 are lifted by the tilting movement out of the apertures 139 so that the dished spring 131 can be rotated for adjustment purposes.

From the external circumference of the dished spring 131, several support tongues 141 arranged with spacing from one another in the circumferential direction protrude to the side disc 9e. The support tongues 141 lie in each case upon domed portions 143 concave towards the dished spring 131 on the internal circumference of the side disc 9e. The domed portions 143 form oblique faces 145 rising axially seen in the circumferential direction, which fix the axial distance of the dished spring 131 from the side disc 9e. In place of the concave domed portion 143 convex domed portions can alternatively be provided.

Figure 14:
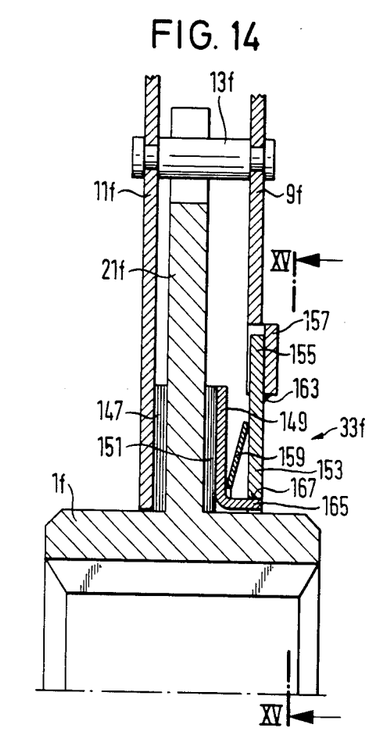
FIG. 14 shows an axial longitudinal section through a first embodiment of a steplessly adjustable friction damper usable in the clutch disc according to FIG. 1.
Figure 15:
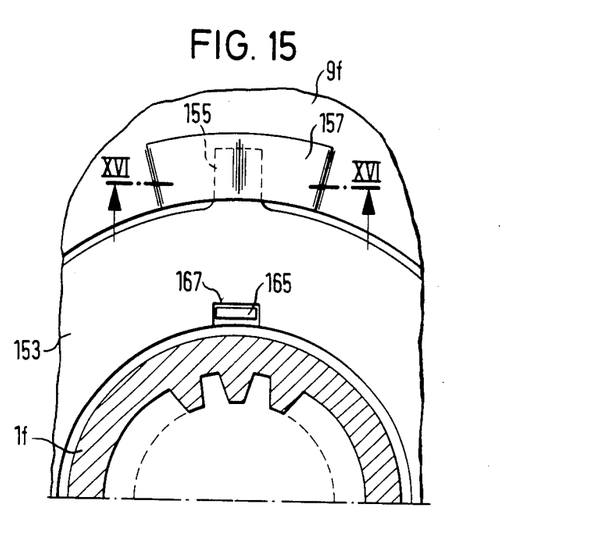
FIG. 15 shows an axial cross-section through the friction damper seen along a line XV—XV in FIG. 14.
Figure 16:
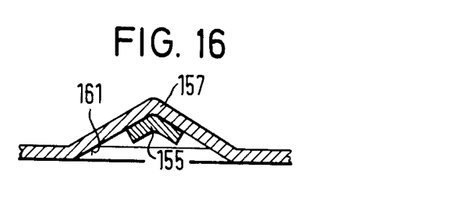
FIG. 16 shows a detail view of the friction damper seen along a line XVI—XVI in FIG. 15.

FIGS. 14 to 16 show a friction damper 33f which is steplessly adjustable as regards its friction torque. The side discs 9f and 11f, connected with one another to form one unit by distance rivets 13f, are mounted rotatably but axially displaceably on the hub 1f. A friction ring 147 is provided axially between the side disc 11f and the hub flange 21f. A thrust ring 149 is arranged axially between the hub flange 21f and the side disc 9f and a further friction ring 151 is arranged axially between the thrust ring 149 and the hub flange 21f. The side disc 9f axially adjacent to the thrust ring 149 forms an annular gap between its internal circumference and the hub 1f, in which an annular support disc 153 is seated. The support disc 153 carries on its external circumference several radially outwardly protruding support tongues 155 arranged with spacing from one another in the circumferential direction, each of which rests on an indentation 157, concave towards the hub flange 21f, in the region of the internal circumference of the side disc 9f. A dished spring 159 of conventional formation is braced in axially between the support ring 153 and the thrust ring 149. The indentations 157 form oblique faces 161 rising axially seen in the circumferential direction. On rotation of the support disc 153 in relation to the side disc 9f the support disc 153 is displaced axially to the side disc 9f whereby the stress force of the dished spring 159 can be adjusted. The support disc 153, after the adjustment of the friction torque, is connected non-rotatably with the side disc 9f by means of one or more welds 163. In place of a welded connection an adhesive connection or the like can also be provided. The thrust plate 149 carries on its internal circumference several tabs 165 protruding axially to the support disc 153 and arranged with spacing from one another in the circumferential direction. The tabs 165 engage in apertures 167 of the support disc 153 and guide the thrust ring 149 non-rotatably but axially displaceably on the support disc 153. In the friction damper 33f again in place of concave indentations convex dogs or the like can be formed on the side disc. Alternatively, the indentations or dogs can also be provided on the support disc 153 and the support tongues 155 can be provided on the side disc 9f.

Figure 17:
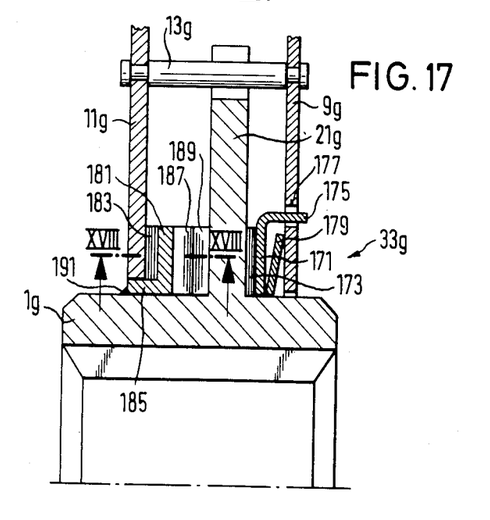
FIG. 17 shows an axial longitudinal section through a second embodiment of a steplessly adjustable friction damper usable in the clutch disc according to FIG. 1.
Figure 18:
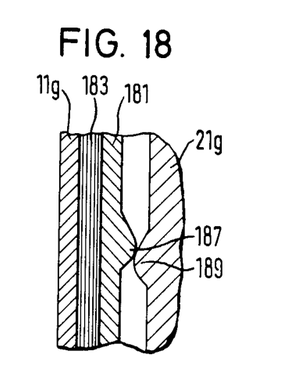
FIG. 18 shows a detail view of the friction damper seen along a line XVIII—XVIII in FIG. 17.

In the friction dampers as explained above the adjusting elements by means of which the stressing of the dished spring is adjusted are provided on the dished spring side of the hub flange. FIGS. 17 and 18 show a steplessly adjustable friction damper 33g the adjusting elements of which are arranged on the side of the hub flange 21g remote from the dished spring. The side discs 9g and 11g, connected with one another through distance rivets 13g to form one unit, are mounted rotatably but axially displaceably on the hub 1g. A thrust ring 171 is arranged axially between the hub flange 21g and the side disc 9g and a friction ring 173 is arranged axially between the thrust ring 171 and the hub flange 21g. The thrust ring 171 carries on its external circumference tabs 175 which engage in apertures 177 of the side disc 9g and guide the thrust ring 171 non-rotatably but axially displaceable on the side disc 9g. A conventional dished spring 179 is braced in axially between the thrust ring 173 and the side disc 9g. A further thrust ring 181 is seated axially between the side disc 11g and the hub flange 21g and a further friction ring 183 is seated axially between the thrust ring 181 and the side disc 11g. The thrust ring 181 is guided on the hub 1g with an attached annular piece 185 protruding towards the side disc 11g. The annular piece 185 forms a bearing position for the side disc 11g and is accessible from the exterior of the side disc 11g.

On the side of the thrust ring 181 axially facing the hub flange 21g there are provided several convex noses 187 arranged with spacing from one another in the circumferential direction, opposite to which there lie convex noses 189 of the hub flange 21g protruding to the thrust ring 181 and arranged distributed at equal intervals in the circumferential direction. The noses 187, 189 seen in the circumferential direction form axially rising oblique faces which on relative rotation of the hub flange 21g and the thrust ring 181 vary the axial spacing of these two parts. The variation of spacing is transmitted from the thrust ring 181 by way of the friction ring 183, the side disc 11g, the distance rivets 13g to the side disc 9g and varies the stress of the dished spring 179. The thrust ring 181 is fixed non-rotatably on the hub 1g by weld spots 191 or by adhesion or swaging after the adjustment of the stress force of the dished spring 179.

Figure 19:
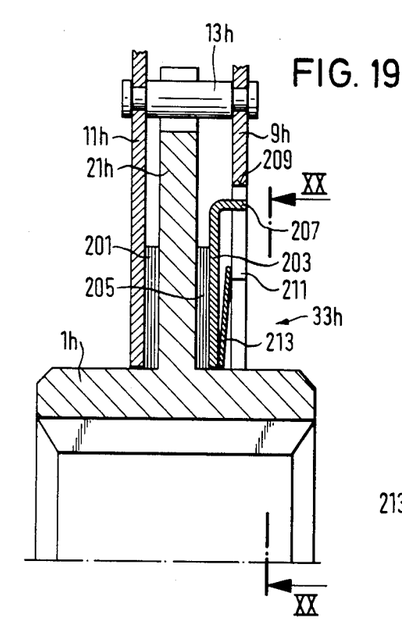
FIG. 19 shows an axial longitudinal section through a first embodiment of a friction damper adjustable by deformation members and usable in the clutch disc according to FIG. 1.
Figure 20:
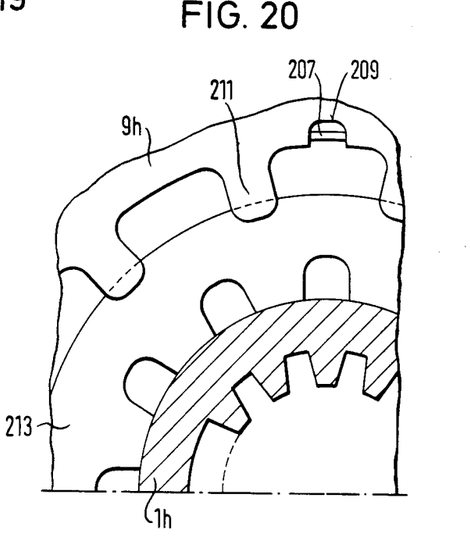
FIG. 20 shows an axial cross-section through the friction damper seen along a line XX—XX in FIG. 19.

The friction dampers as explained above comprise adjusting elements rotatable in relation to one another which render possible the subsequent adjustment of the installation height of the dished spring of the friction damper arranged between the side discs. FIGS. 19 and 20 show, compared therewith, a friction damper 33h the friction torque of which can be adjusted by deformable elements. The friction damper 33h again comprises side discs 9h and 11h which are connected fixedly into one unit by distance rivets 13h. The unit is mounted non-rotatably but axially displaceably on the hub 1h by means of the side discs 11h. A friction ring 201 is seated axially between the side disc 11h and the hub flange 21h. A thrust ring 203 is arranged axially between the side disc 9h and the hub flange 21h and a further friction ring 205 is arranged axially between the thrust ring 203 and the hub flange 21h. The thrust ring 203 carries axially bent-off tabs 207 on its external circumference which engage in apertures 209 of the side disc 9h and guide the thrust ring 203 non-rotatably but axially displaceably on the side disc 9h. Several approximately radially extending support tongues 211 arranged with spacing from one another in the circumferential direction are formed or punched free on the side disc 9h, substantially on one common diameter. A conventional dished spring 213 is braced in axially between the thrust ring 203 and the side disc 9h. The dished spring 213 is supported on the thrust ring 203 for the one part and the free ends of the support tongues 211 for the other. For the adjustment of the installation height of the dished spring 213 and thus its stress force and the friction torque of the friction damper 33h, the support tongues 211 are bent away in permanent deformation against the force of the dished spring 213 towards the hub flange 21h. For this purpose the side disc 11h is set upon a support and the support tongues 211 are bent by means of a tool or the like towards the side disc 11h.

Figure 21:
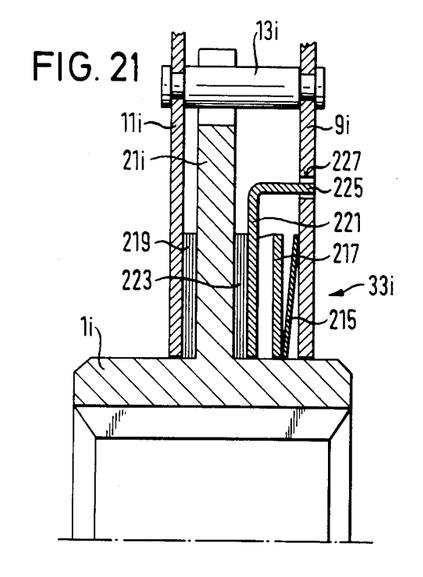
FIG. 21 shows an axial longitudinal section through a second embodiment of a friction damper adjustable by a deformation member and usable in the clutch disc according to FIG. 1.
Figure 22:
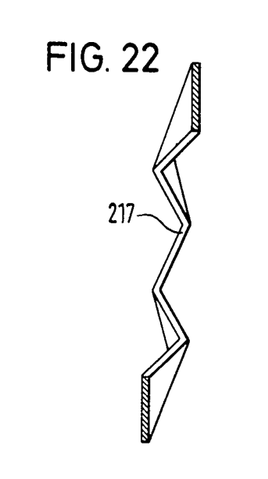
FIG. 22 shows an axial longitudinal section through the deformation member of the friction damper according to FIG. 21.

FIG. 21 shows a friction damper 33i in which the installation height of a conventional dished spring 215 is adjustable by means of a corrugated ring 217 arranged in the support path of the dished spring 215 and represented in detail in FIG. 22. The side discs 9i and 11i, firmly connected with one another through distance rivets 13i, are mounted rotatably but axially displaceably on the hub 1i similarly to the friction dampers as explained above. A friction ring 219 is seated axially between the side disc 11i and the hub flange 21i. A thrust ring 221 is arranged axially between the side disc 9i and the hub flange 21i and a further friction ring 223 is arranged axially between the thrust ring 221 and the hub flange 21i. The thrust ring 221 carries axially bent-off tabs 225 on its external circumference which engage in openings 227 of the side disc 9i and guide the thrust ring 221 non-rotatably but axially displaceably on the side disc 9i. The dished spring 215 and the corrugated ring 217 are seated axially side by side between the thrust ring 221 and the side disc 9i.

FIG. 22 shows details of the corrugated ring 217. The corrugated ring 217 is corrugated in the circumferential direction and can be axially flattened in permanent deformation by axial pressure. For the adjustment of the stress force of the dished spring 215 and thus of the friction torque of the friction damper 33i, the hub 1i is set on the side of the side disc 11i upon a support and the side disc 9i is pressed against the force of the dished spring 215 axially against the hub flange 21i until the corrugated ring 217 is flattened to the desired dimension.

Figure 23:
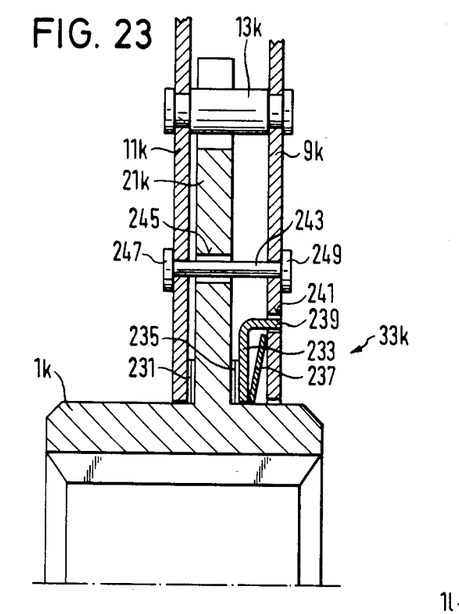
FIG. 23 shows an axial longitudinal section through a third embodiment of a friction damper adjustable by deformation members and usable in the clutch disc according to FIG. 1.

FIG. 23 shows a friction damper 33k the friction torque of which is adjustable by subsequent permanent deformation of adjusting elements. The side discs 9k and 11k, fixedly connected with one another through distance rivets 13k, are guided rotatably but axially displaceably as a unit on the hub 1k. A friction ring 231 is seated axially between the side disc 11k and the hub flange 21k. A thrust ring 233 is arranged axially between the side disc 9k and the hub flange 21k and a further friction ring 235 is arranged axially between the thrust ring 233 and the hub flange 21k. A conventional dished spring 237 is supported axially between the thrust ring 233 and the side disc 9k. The thrust ring 233 carries axially protruding tabs 239 on its external circumference which engage in openings 241 of the side disc 9k and guide the side disc 233 non-rotatably but axially displaceably on the side disc 9k. To this extent the friction damper 33k corresponds to conventional friction dampers.

In order that the stress force of the dished spring 237 may be adjusted, deformation members 243 of rivet form are provided on a diameter radially between the internal circumference of the side discs 9k and 11k and the distance rivets 13k. The deformation members 243 connect the side discs 9k, 11k with one another and extend through apertures 245 of the hub flange 21k. The apertures 245 are dimensioned in the circumferential direction in accordance with the maximum relative angle of rotation of the friction lining carrier and the hub. The deformation members 243 carry heads 247, 249 at their ends which engage behind the side discs 9k, 11k on the outer sides facing axially away from one another. The deformation members 243, several of which are arranged with spacing from one another in the circumferential direction, are permanently deformed and axially shortened by axial compression. The radially inner regions of the side discs 9k, 11k are brought closer to one another in this way, whereby the installation height of the dished spring 237 is reduced and its stress force is increased.

Figure 24:
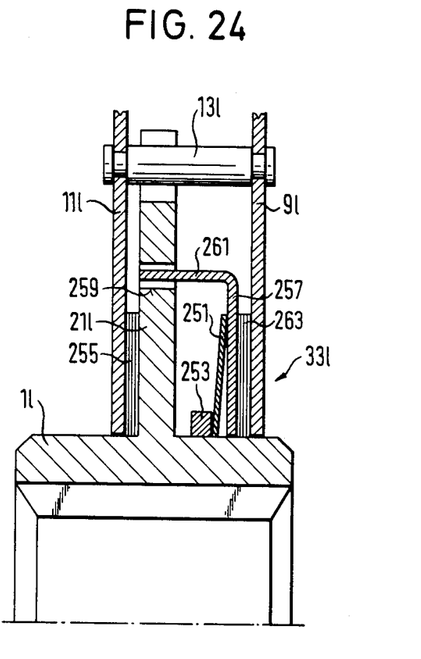
FIG. 24 shows an axial longitudinal section through a first embodiment of a friction damper adjustable by means of a part held in frictional engagement and usable in the clutch disc according to FIG. 1.

FIG. 24 shows a friction damper 33l in which the installation height of a conventional dished spring 251 generating the friction force is adjustable by means of an adjusting ring 253 seated with press fit on the hub 1l. The side discs 9l and 11l firmly connected with one another through distance rivets 13l are mounted rotatably but axially displaceably on the hub 1l. A friction ring 255 is seated axially between the side disc 11l and the hub flange 21l. A thrust ring 257 is arranged axially between the hub flange 21l and the side disc 9l and is guided non-rotatably but axially displaceably on the hub flange 21l by means of axially bent-over tabs 261 engaging in apertures 259 of the hub flange 21l. A friction ring 263 is arranged axially between the thrust ring 257 and the side disc 9l. The adjusting ring 253 encloses the hub 1l axially between the hub flange 11l and the thrust ring 257. The dished spring 251 is braced in between the adjusting ring 253 and the thrust ring 257. The adjusting ring 253 is seated in frictional engagement with press fit on the hub 1l, the spring force of the dished spring 251 not being sufficient to be able to shift the adjusting ring 253 axially.

For the adjustment of the friction torque the hub 1l is placed upon a support on the side axially remote from the adjusting ring 253 and adjusted by means of a tool or the like which acts through the side disc, the friction ring 263, the thrust ring 257 and the elastically flattening dished spring 251 upon the adjusting ring 253.

Figure 25:
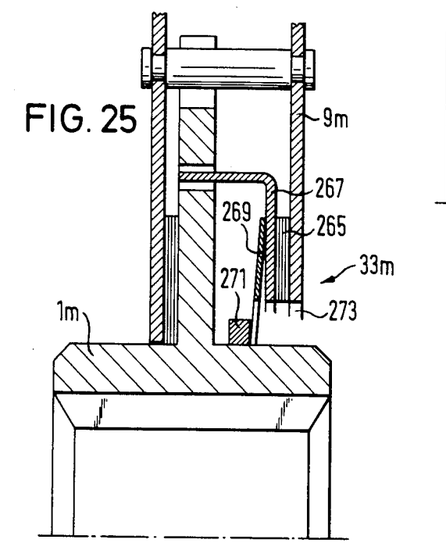
FIG. 25 shows an axial longitudinal section through a second embodiment of a friction damper adjustable by means of a part held in frictional engagement and usable in the clutch disc according to FIG. 1.

FIG. 25 shows a friction damper 33m which differs from the friction damper 33l only in that the side disc 9m, the friction ring 265 corresponding to the friction ring 263, the thrust ring 267 corresponding to the thrust ring 257 and the dished spring 269 corresponding to the dished spring 251 comprise openings 273 aligned with one another in axial projection of the adjusting ring 271 corresponding to the adjusting ring 253, through which openings a tool (not shown further) can be introduced for the displacement of the adjusting ring 271 seated in press fit on the hub 1m. Particularly in the case of high press fit force, in this way pressure damage to the pressure-transmitting parts can be avoided reliably.

While specific embodiments of the invention have been shown and described in detail to illustrate the application of the inventive principles, it will be understood that the invention may be embodied otherwise without departing from such principles.

We claim:

1. Clutch disc for a motor vehicle friction clutch comprising:
   (a.) a hub (1);
   (b.) a friction lining carrier (7) supported on said hub, said friction lining carrier being rotatable relative to said hub through a limited angle of rotation about the rotational axis (5) of said hub;
   (c.) a torsional vibration spring damper arranged in a torque transmission path between said hub and said friction lining carrier, said friction lining carrier comprising an essentially radially extending first disc part means (9, 11), said first disc part means comprising a first disc (9) and a second disc (11) rigidly connected with each other and axially spaced from each other, a second disc part means (21) secured to and extending essentially radially outwardly from said hub and arranged axially between the first and second discs (9, 11), said spring damper comprising at least one damping spring (31) arranged in windows (25, 27, 29) of said first and second disc part means (9, 11, 21) which is stressable upon relative rotation of the first and second disc part means (9, 11, 21);
   (d.) a torsional vibration friction damper (33) with at least one axially acting preloaded spring (43) axially arranged between said second disc part means (21) and said first disc (9) of said first disc part means to be co-axial with same, and at least one friction ring (37, 41) arranged in an abutment force path of said preloaded spring (43) axially between one (9) of said first and second discs and said second disc part means and arranged co-axial therewith;
   (e.) an adjustment device (49, 53) arranged in the abutment force path of said preloaded spring, by means of which the axial spacing between a radially outer edge region and a radially inner edge region of the preloaded spring is adjustable wherein the preloaded spring (43) is rotatable about the axis of rotation (5) relative to said first disc (9) of said first disc part means for the adjustment, said preloaded spring having several support tongues (49) spaced apart in circumferential direction, said first disc (9) having axial abutment steps (53) arranged in groups with each group corresponding to a respective one of the individual support tongues (49), so that the support tongues (49) rest on selected ones of said abutment steps, wherein said support tongues (49) are spaced from one another corresponding to the angular extent of each of said groups;
   and wherein snap-in shoulders (55) extending in a circumferential direction of said first disc (9) are provided between each of the abutment steps (53) in at least one of the groups of abutment steps (53), which lock the preloaded spring (43) through the support tongues (49) so that the preloaded spring does not rotate relative to said first disc (9) of said first disc part means.

2. The clutch disc according to claim 1, wherein said abutment steps are formed by essentially radially projecting first tongues (53) which are axially offset with respect to each other, and said snap-in shoulders comprise additional tongues (55) projecting essentially radially between said first tongues (53) and between which said support tongues (49) of said preloaded spring (43) are gripped.

3. The clutch disc according to claim 1 wherein said first disc (9) is provided with said abutment steps and has at least one aperture (35) therethrough, so that access through said aperture is available for rotating said preloaded spring (43) around the axis of rotation.

4. The clutch disc according to claim 3, wherein said first disc part means (9, 11) is rotatably supported as a unit for a limited angle on said hub (1), and said aperture (35) is formed by an annular gap between the inner circumference of said first disc (9) and said hub (1).

* * * * *